(12) United States Patent
Zhong et al.

(10) Patent No.: US 8,848,774 B2
(45) Date of Patent: Sep. 30, 2014

(54) ADAPTATION OF A LINEAR EQUALIZER USING A VIRTUAL DECISION FEEDBACK EQUALIZER (VDFE)

(75) Inventors: Lizhi Zhong, Sunnyvale, CA (US); Cathy Ye Liu, San Jose, CA (US); Amaresh Virupanagouda Malipatil, Milpitas, CA (US); Freeman Zhong, San Ramon, CA (US)

(73) Assignee: LSI Corporation, Milpitas, CA (US)

( * ) Notice: Subject to any disclaimer, the term of this patent is extended or adjusted under 35 U.S.C. 154(b) by 1394 days.

(21) Appl. No.: 12/193,802

(22) Filed: Aug. 19, 2008

(65) Prior Publication Data

US 2010/0046598 A1 Feb. 25, 2010

(51) Int. Cl.
| | |
|---|---|
| *H03H 7/30* | (2006.01) |
| *H03H 7/40* | (2006.01) |
| *H03K 5/159* | (2006.01) |
| *H04L 25/03* | (2006.01) |

(52) U.S. Cl.
CPC . *H04L 25/03057* (2013.01); *H04L 2025/03605* (2013.01); *H04L 2025/03808* (2013.01); *H04L 25/03038* (2013.01); *H04L 25/03343* (2013.01)
USPC ............ 375/232; 375/299; 375/233; 375/350

(58) Field of Classification Search
USPC .................................................. 375/229–236
See application file for complete search history.

(56) References Cited

U.S. PATENT DOCUMENTS

| | | | | |
|---|---|---|---|---|
| 6,907,064 B1* | 6/2005 | Tokunaga et al. | ............. | 375/232 |
| 7,170,931 B2* | 1/2007 | Greiss et al. | .................. | 375/232 |
| 7,171,608 B2* | 1/2007 | Aida et al. | ..................... | 714/794 |
| 7,561,619 B2* | 7/2009 | Asuri et al. | .................... | 375/233 |
| 8,073,046 B2* | 12/2011 | Cohen et al. | .................. | 375/232 |
| 8,433,973 B2* | 4/2013 | Choi et al. | ..................... | 714/758 |
| 2002/0051502 A1* | 5/2002 | Mathe | .......................... | 375/316 |
| 2002/0172275 A1* | 11/2002 | Birru | ............................. | 375/233 |
| 2003/0223489 A1* | 12/2003 | Smee et al. | .................. | 375/233 |
| 2006/0203899 A1* | 9/2006 | Gee | ................................ | 375/232 |
| 2008/0232453 A1* | 9/2008 | Cohen et al. | .................. | 375/232 |
| 2008/0240293 A1* | 10/2008 | Kim et al. | ..................... | 375/316 |
| 2009/0304065 A1* | 12/2009 | Choi et al. | .................... | 375/232 |

* cited by examiner

*Primary Examiner* — Sam K Ahn
*Assistant Examiner* — James M Perez
(74) *Attorney, Agent, or Firm* — Raj Abhyanker, P.C.

(57) ABSTRACT

A method and system of adaptation of a linear equalizer using a virtual decision feedback equalizer (VDFE) are disclosed. In one embodiment, a method of adjusting a setting of a linear equalizer includes determining a change to a decision feedback equalizer (DFE) tap weight value of a predefined metric according to a data signal and an error signal (e.g., the change may be generated according to an average of a specified plurality of data signals and the error signal); using the change in the DFE tap weight value to algorithmically generate a modification in a linear equalizer setting; and adjusting the linear equalizer setting. The linear equalizer is located in a feed-forward path and/or a feedback path of data transmission. The linear equalizer may be located in a transmitter and/or a receiver. The linear equalizer may be a continuous time linear equalizer and/or a Finite Impulse Response (FIR) linear equalizer.

17 Claims, 18 Drawing Sheets

CONVERTER $1204_2$ OF
THE MAPPER 114, 414

CONVERTER 1204₃ OF
THE MAPPER 114, 414

ADAPTATION OF A LINEAR EQUALIZER USING A VIRTUAL DECISION FEEDBACK EQUALIZER (VDFE)

FIELD OF TECHNOLOGY

This disclosure relates generally to an enterprise method, a technical field of hardware technology and, in one example embodiment, to adaptation of a linear equalizer using a virtual decision feedback equalizer (VDFE).

BACKGROUND

A linear equalizer (e.g., a linear finite impulse response equalizer, a continuous time linear equalizer, a feedback path linear equalizer, etc.) may be used to reduce an inter-symbol interference (ISI) in a circuit (e.g., a communications circuit, a Serializer/Deserializer (SerDes), etc.). However, the linear equalizer may increase a noise (e.g., an unwanted signal characteristic, a thermal noise, etc.) and/or a crosstalk. The linear equalizer may also not effectively remove ISI against a channel with a deep frequency null.

The linear equalizer may also have an adaptation problem (e.g., tuning a setting of the linear equalizer). For example, a designer may manually adjust the setting (e.g., a pole setting, a zero setting, a gain setting, etc.) such that the linear equalizer transfer function in the frequency domain may be a least mean square match to the inverse of the channel frequency response at relevant frequencies. However, a channel response may not be known in advance. In addition, an optimization algorithm used to match the linear transfer function (e.g., the inverse of the channel frequency response in the least mean square sense) to a target response may be complex.

SUMMARY

A method and system of adaptation of a linear equalizer using a virtual decision feedback equalizer (VDFE) are disclosed. In one aspect, a method of adjusting a setting of a linear equalizer includes determining a change to a decision feedback equalizer (DFE) tap weight value of a predefined metric according to a data signal and an error signal (e.g., the change may be generated according to an average of a specified number of data signals and the error signal), using the change in the DFE tap weight value to algorithmically generate a modification in a linear equalizer setting, and adjusting the linear equalizer setting.

The error signal may be generated by a number of methods including: (1) comparing an input to a decision device to a target value multiplied by a current data signal to generate a difference that is the error signal, (2) sampling the input to the decision device at a different phase than that of the current data signal if the current data signal has different polarity from a previous data signal to generate the error signal, and/or setting the error signal to zero when polarity of the current data signal and polarity of the previous data signal are the same.

The modification in the linear equalizer setting may be generated by a number of methods including: (1) averaging a set of changes in a specified number of DFE tap weight values, (2) applying a logic OR of a set of changes in the specified number of DFE tap weight values, (3) using a same polarity as that of a majority of the set of changes in the specified number of DFE tap weight values, and/or (4) using a change in a first DFE tap weight value if it has a different polarity from a change in a second DFE tap weight value, and zero if polarity is the same.

The linear equalizer setting may be adjusted continuously (e.g., in a loop pattern) and/or may be adjusted until the DFE tap weight value converges. Convergence may be determined by (1) determining that the change in the DFE tap weight value is lower than a first threshold determined from an offline simulation, and/or (2) determining that a number of symbols since a beginning of an adaptation is below a second threshold determined from the offline simulation.

The linear equalizer is located in a feed-forward path and/or a feedback path of data transmission. The linear equalizer may be located in a transmitter and/or a receiver. The linear equalizer may be a continuous time linear equalizer. A setting of the continuous time linear equalizer may be (1) a pole setting adjusted according to a change parameter only if a specified number of change parameters have different polarity, (2) a gain setting, and/or (3) a zero setting.

Alternatively, the linear equalizer may be a Finite Impulse Response (FIR) filter. A setting of the FIR filter may be a tap weight of the FIR filter. A modification of a FIR filter tap weight may be determined according to an average of a set of changes of a specified number of DFE tap weight values. The specified number of DFE tap weight values used to generate the modification in the linear equalizer setting may be different from those used by a real DFE if it exists in a same receiver. In addition, corresponding tap positions of the DFE tap weight values may/may not consecutive.

In another aspect, a communications system may include: a linear equalizer to reduce an inter-symbol interference (ISI), a decision device to generate a data signal and an error signal, and a VDFE subsystem. The VDFE subsystem may generate a change to a DFE tap weight value according to a data signal and an error signal. In addition, the VDFE may use the change in the DFE tap weight value to algorithmically generate the modification in a linear equalizer setting and may adjust the linear equalizer setting. An optional decision feedback equalizer (DFE) may further reduce the ISI.

The VDFE subsystem may further include an adaptation loop to generate the change to the DFE tap weight value according to the data signal and the error signal, and a mapper subsystem. The adaptation loop may generate a change in a DFE tap weight value according to an average of a specified number of data signals and the error signal. The mapper subsystem may map the change in the DFE tap weight value to the modification in the linear equalizer setting, and may adjust the linear equalizer setting until the DFE tap weight value converges.

The mapper subsystem may include a converter to use the change in the DFE tap weight value to algorithmically generate the modification in the linear equalizer setting and an accumulator to filter an output of the converter. The converter may generate the modification in the linear equalizer setting through: (1) an average of a set of changes in a specified number of DFE tap weight values, (2) a logic OR of the set of changes in the specified number of the DFE tap weight values, (3) a same polarity as that of a majority of the set of changes in the specified number of DFE tap weight values, and/or (4) a same change as that of a first DFE tap weight value if it has different polarity from a change in a second DFE tap weight value and zero if a polarity is the same.

In yet another aspect, an integrated circuit device may include a linear equalizer to reduce an inter-symbol interference (ISI), a decision module to generate a data signal and a error signal, a VDFE comprising an adaptation loop to determine a change to a decision feedback equalizer (DFE) tap weight value of a predefined metric according to a data signal and an error signal, and a mapper of the VDFE to use the change in the DFE tap weight value to algorithmically generate a modification in a linear equalizer setting.

The decision module may include any one or more of the following: (1) a data latch to sample an input and to generate a current data signal, (2) an error latch to generate the error signal, (3) an adder circuit to compare the input to a target value multiplied by the current data signal, (4) a shift register to store a previous data signal, a XOR circuit to determine if the current data signal and the previous data signal have the same polarity, (5) a multiplication circuit to multiply the current data signal by the target value, and/or (6) a multiplexer to select at least one of the error latch output and zero based on whether the current data signal has different polarity from the previous data signal.

The adaptation loop may include any one or more of the following: (1) a XOR circuit to determine if an average of the current data signal and a previous data signal has a same polarity as that of the error signal, (2) a multiplexer to select at least one of an increase and a decrease of the DFE tap weight value, (3) an adder circuit to add the current data signal and the previous data signal, and/or (4) a shift circuit to determine an average of the current data signal and the previous data signal.

The mapper may include a converter circuit that may have one or more of the following: (1) an adder circuit to add up a set of changes of a number of DFE tap weight values, (2) an OR circuit to perform an OR function of the set of changes of the number of DFE tap weight values, (3) a majority logic circuit to select a dominant polarity of the set of changes of the number of DFE tap weight values, (4) a multiplication circuit to multiply changes in the DFE tap weight with a coefficient, (5) a sign module to determine the polarity of the input signal, (6) a multiplexer circuit to output at least one of a change and a no change based on whether a first DFE tap weight change has a same polarity as a second DFE tap weight change, (7) a XOR circuit to compare a polarity of the change of the first DFE tap weight value with the polarity of a second DFE tap weight value, and/or (8) an accumulator to filter a modification in the linear equalizer setting.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not a limitation in the figures of the accompanying drawings, in which like references indicate similar elements and in which.

Other features of the present embodiments will be apparent from the accompanying drawings and from the detailed description that follows.

DETAILED DESCRIPTION

A method and system of adaptation of a linear equalizer using a virtual decision feedback equalizer (VDFE) are disclosed. Although the present embodiments have been described with reference to specific example embodiments, it will be evident that various modifications and changes may be made to these embodiments without departing from the broader spirit and scope of the various embodiments.

This disclosure makes references to five example embodiments as illustrated in FIGS. 1 to 5 which illustrate operations of a virtual decision feedback linear equalizer (VDFE) in different configurations of a transmitter and/or receiver. It will be appreciated that the five example embodiments are not limiting, and should be noted that a variety of alternative embodiments are possible. The five example embodiments are used as discussion points to highlight the novelty and operating environments of the VDFE.

Figure 1:
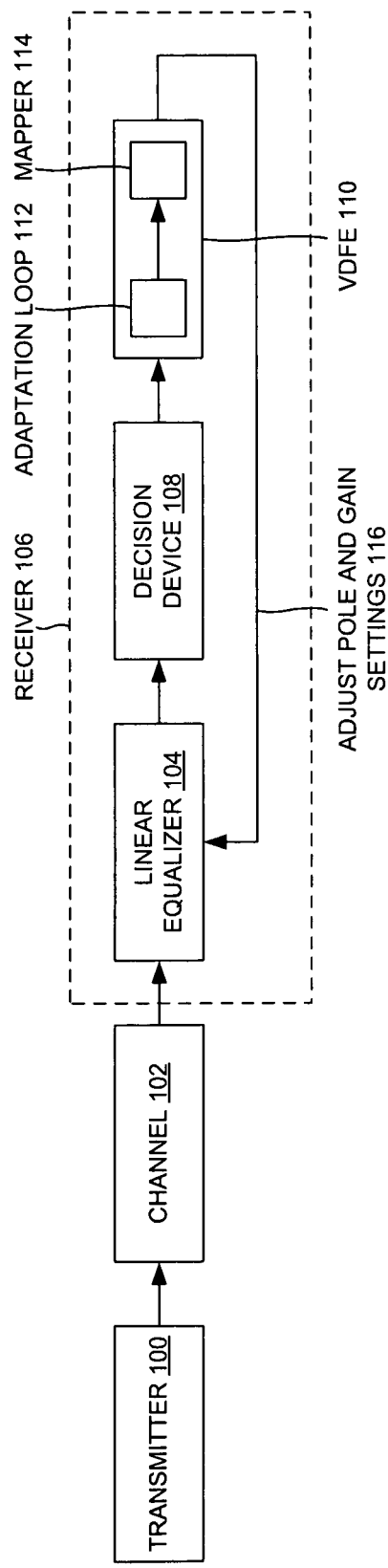
FIG. 1 is a transmitter communicating with a receiver having a linear equalizer in a feed-forward path whose pole and gain settings are adjusted through a virtual decision feedback equalizer (VDFE) in the receiver, according to one embodiment.
Figure 2:
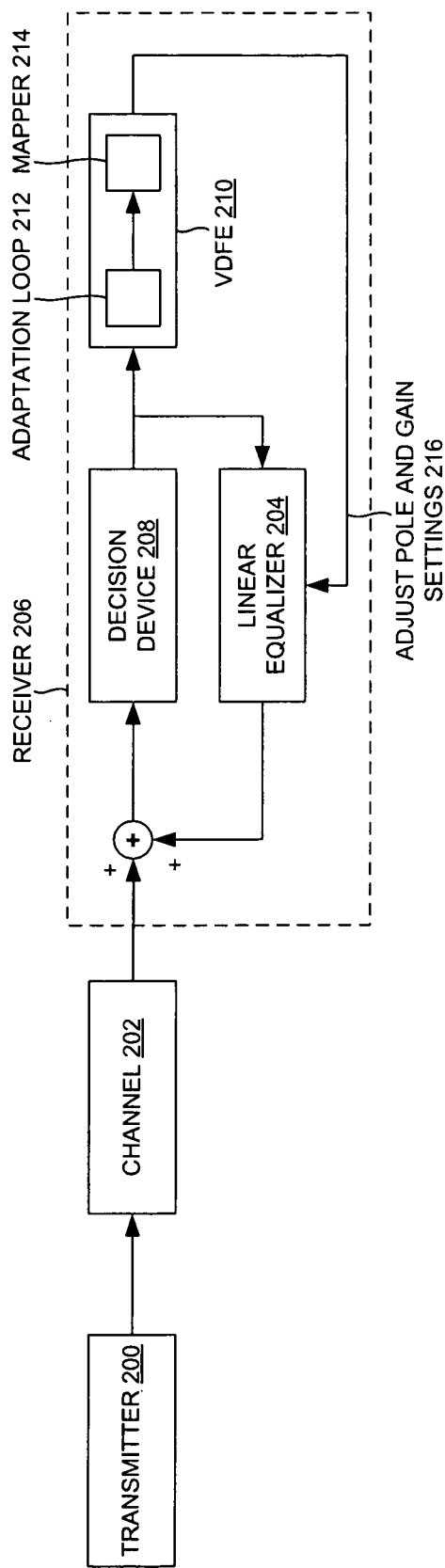
FIG. 2 is a transmitter communicating with a receiver having a linear equalizer in a feedback path whose pole and gain settings are adjusted through a virtual decision feedback equalizer (VDFE) in the receiver, according to one embodiment.
Figure 3:
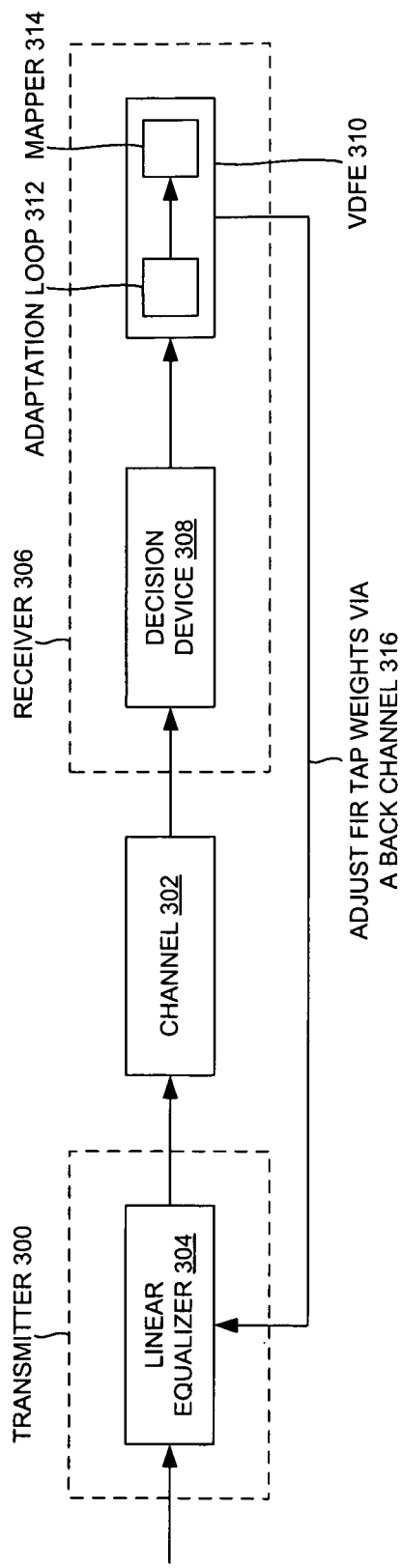
FIG. 3 is a transmitter having a linear equalizer whose Finite Impulse Response (FIR) tap weights are adjusted via a back channel from a virtual decision feedback equalizer (VDFE) in a receiver, according to one embodiment.
Figure 4:
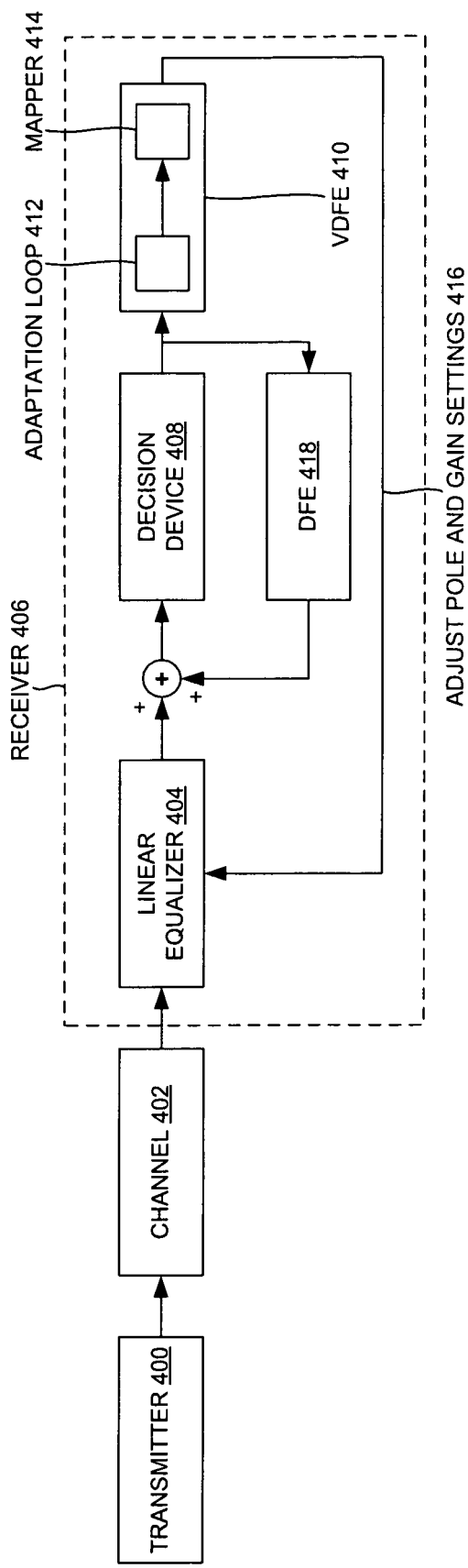
FIG. 4 is a transmitter communicating with a receiver with a decision feedback equalizer (DFE) having a linear equalizer in a feed-forward path whose pole and gain settings are adjusted through a virtual decision feedback equalizer (VDFE) in the receiver, according to one embodiment.
Figure 5:
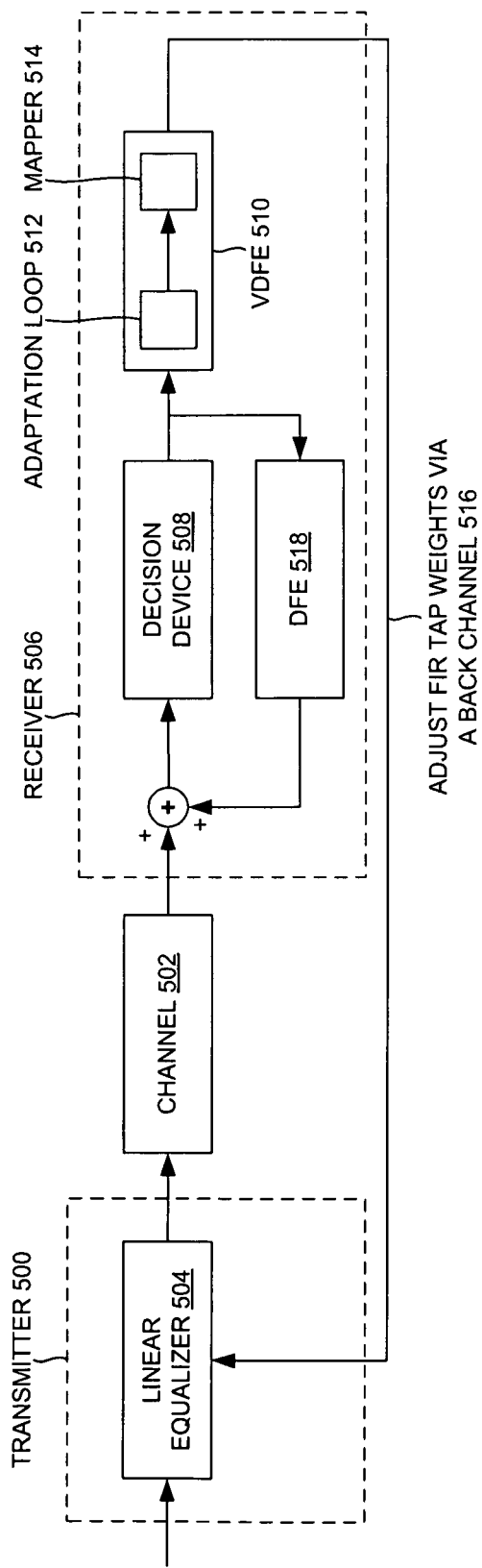
FIG. 5 is a transmitter having a linear equalizer whose Finite Impulse Response (FIR) tap weights are adjusted via a back channel from a virtual decision feedback equalizer (VDFE) in a receiver having a decision feedback equalizer (DFE), according to one embodiment.

In particular, observing locations of the linear equalizers (e.g., linear equalizers 104, 204, 304, 404, and 504 as illustrated in FIGS. 1-5) and the presence/absence of a decision feedback linear equalizer (DFE) (DFE 418, 518 of FIGS. 4, and 5) help contrast the embodiments of FIGS. 1-5. The linear equalizers (linear equalizers of 104, 204, 404 of FIGS. 1, 2, and 4) of FIGS. 1, 2, and 4 are sometimes referred to as continuous time linear equalizers. In contrast, the linear equalizers (linear equalizers 304 and 504) of FIGS. 3 and 5 are sometimes referred to as Finite Impulse Response (FIR) linear equalizers.

FIG. 2 contrasts with the other configurations of FIGS. 1, 3, 4, and 5 because the linear equalizer 204 of FIG. 2 is illustrated in the feedback path of the receiver 206. FIGS. 4 and 5 illustrate the presence of a decision feedback equalizer (DFE) in the receivers 406 and 506 respectively. We will begin the discussion by describing each of these five configurations in detail.

Figure 7:
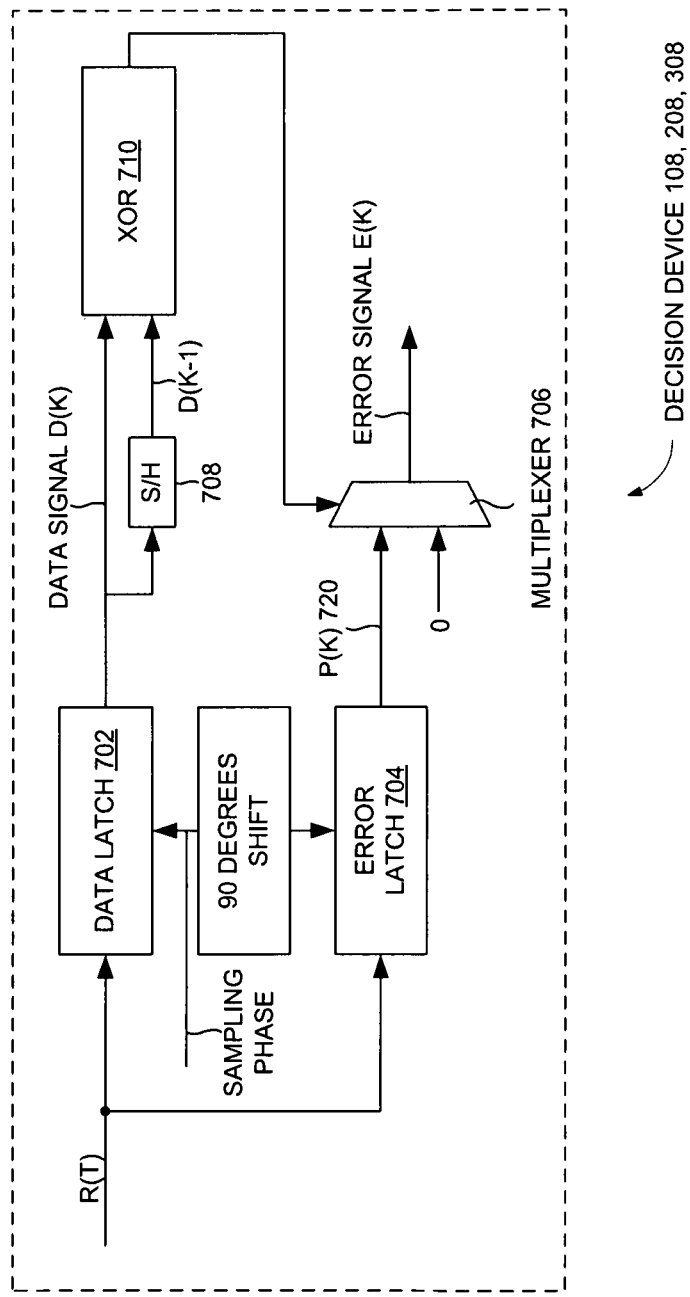
FIG. 7 is an exploded view of a decision device of FIGS. 1, 2 and 3 having a data latch to sample an input and to generate a current data signal, an error latch in which the input to the decision device is sampled at a different phase (e.g., 90 degrees shift) than that of the current data signal, a shift register to store a previous data signal, a XOR circuit to determine if the current data signal and the previous data signal have the same polarity and a multiplexer to select at least one of the error latch output and zero based on whether the current data signal has different polarity from the previous data signal, according to one embodiment.
Figure 8:
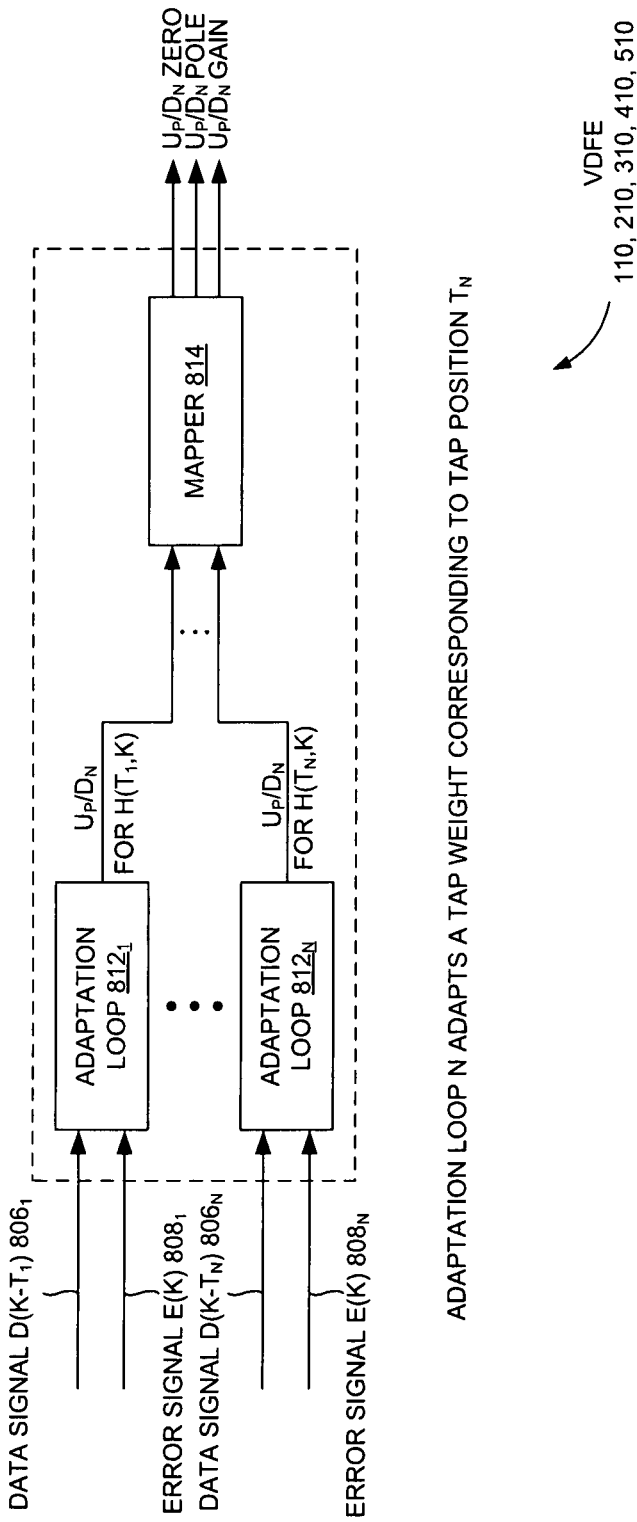
FIG. 8 is an exploded view of a virtual decision feedback equalizer (VDFE) of FIGS. 1-5 used to generate a modification in a linear equalizer setting based on a data signal and an error signal having adaptation loops, which can be any one of the adaptation loops of FIGS. 1-5, and a mapper, which can be any one of the mappers of FIGS. 1-5, according to one exemplary embodiment.

FIG. 1 is a transmitter 100 communicating with a receiver 106 having a linear equalizer 104 in a feed-forward path whose pole and gain settings 116 are adjusted through a virtual decision feedback equalizer (VDFE) 110 in the receiver 106, according to one embodiment. The receiver 106 is shown with a linear equalizer 104 in the feed forward path coupled to a decision device 108 (e.g., as described in the description of FIG. 7). The decision device 108 may communicate with a virtual decision feedback equalizer (DFE) 110. The VDFE 110, in turn, may provide output information. An exploded view of the VDFE 110 is illustrated in FIG. 8.

Figure 10:
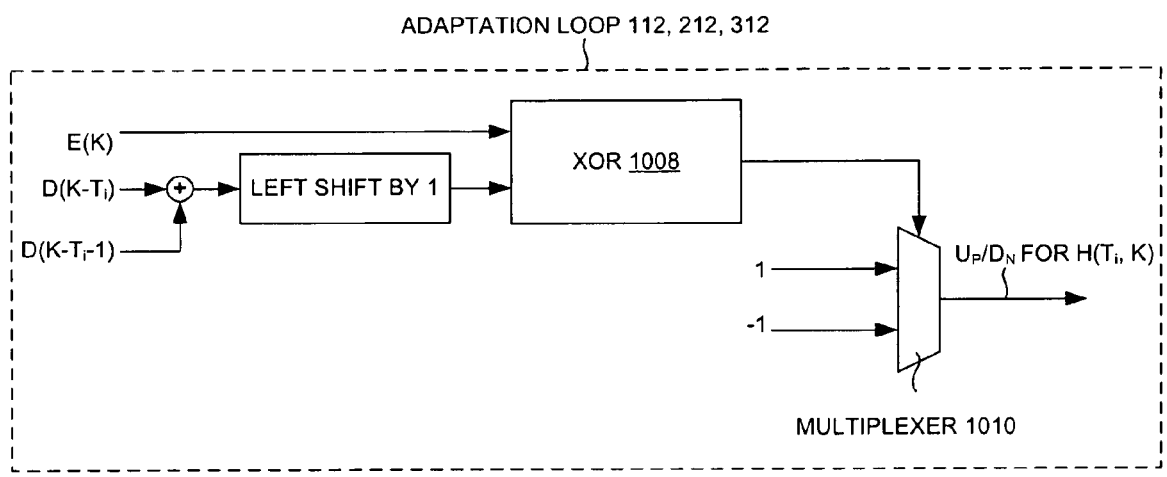
FIG. 10 is an exploded view of an adaptation loop of FIGS. 1, 2, and 3 having an adder circuit to add a current data signal and a previous data signal, a shift circuit to determine an average of the current data signal and the previous data signal, a XOR circuit to determine if an average of the current data signal and the previous data signal has a same polarity as that of the error signal, and a multiplexer to select at least one of an increase and a decrease of the DFE tap weight value, according to one embodiment.

The output information may be used to adjust the pole and gain settings 116 of the linear equalizer 104. The VDFE 110 may include an adaptation loop 112 and a mapper 114 (shown in exploded view in FIG. 11). The adaptation loop 112 and the mapper 114 may be used to create the output for the linear equalizer 104. An exploded view of the adaptation loop 112 is illustrated in FIG. 10.

Figure 9:
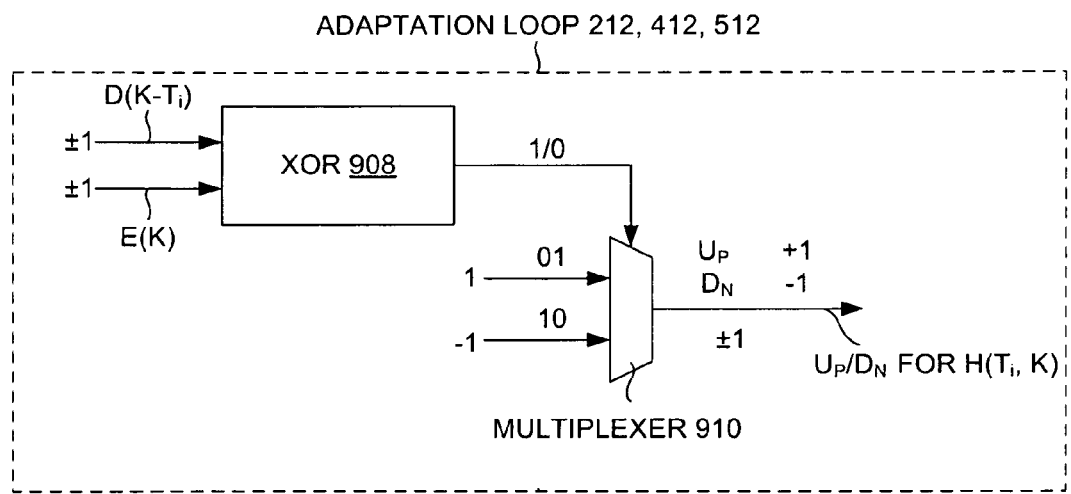
FIG. 9 is an exploded view of an adaptation loop of FIGS. 2, 4 and 5, having a XOR circuit to determine if an average of a single data signal has a same polarity as that of the error signal, and a multiplexer to select at least one of an increase and a decrease of the DFE tap weight value, according to one embodiment.

The predefined metric may include a mean square error, a bit error rate and/or an eye opening. A least-mean-square (LMS) algorithm may be used to minimize the mean square error. The metric may be a minimum mean square error and the change may be an equal to $\Delta H(J, K)=E(K)*D(K-J)$, as shown in FIG. 9. $\Delta H$ may be the change of the tap weight of tap position J and E may be the error signal at symbol index K and D may be the data signal value. The direction of change in the gain setting may use a table lookup, and the bias current of transistors in the linear equalizer may be varied based on output of VDFE. The following table may be a particular example of the change in the gain setting (e.g., $\Delta G$) and the pole setting (e.g., $\Delta P$).

| $\Delta H(J, K)$ | $\Delta H(J, K)$ | $\Delta G$ | $\Delta P$ |
|---|---|---|---|
| up | up | up | / |
| down | down | down | / |
| up | down | / | up |
| down | up | / | down |

The change in gain setting ($\Delta G$) and the pole setting ($\Delta P$) may be put in an accumulator and then compared to a particular configurable threshold. When the context of the accumulator exceeds the configurable threshold the up and/or down signal may be created. The above operations may be repeatable on a constant basis.

FIG. 2 is a transmitter 200 communicating with a receiver 206 having a linear equalizer 204 in a feedback path whose pole and gain settings 216 are adjusted through a virtual decision feedback equalizer (VDFE) 210 in the receiver 206, according to one embodiment. In this particular embodiment, the receiver 206 includes a decision device 208, a linear equalizer 204 and the VDFE 210. An exploded view of the VDFE 210 is illustrated in FIG. 8. It should be noted that FIG. 2 is similar to FIG. 1 except that in this particular embodiment, the linear equalizer 204 may be located in the feedback path of the decision device 208 (e.g., the decision device 208 as described in the description of FIG. 7). In contrast, in FIG. 1, the linear equalizer is located in the feed forward path. In FIG. 2, the VDFE 210 may also include an adaptation loop 212 and a mapper 214 (described in exploded view in FIG. 11). The adaptation loop 212 and a mapper 214 may be used to supply the output information for the linear equalizer 204. Exploded views of two versions of the adaptation loop 212 are illustrated in FIG. 9 and FIG. 10. Adjustments necessary to change the pole and gain settings 216 of the linear equalizer 204 in the feedback path may be provided by the output of the VDFE 210.

FIG. 3 is a transmitter 300 having a linear equalizer 304 whose Finite Impulse Response (FIR) tap weights are adjusted via a back channel 316 from a virtual decision feedback equalizer (VDFE) 310 in a receiver 306, according to one embodiment. FIG. 3 illustrates similar concepts to FIG. 1 and FIG. 2 except that the linear equalizer 304 is now be in the transmitter rather than the receiver (e.g., reflecting a Finite Impulse Response FIR filter). The decision device 308 of FIG. 3 is described in further detail in FIG. 7. An exploded view of the VDFE 310 is illustrated in FIG. 8.

In this particular example embodiment, the transmitter 300 of FIG. 3 is illustrated as communicating with a receiver 306 through a channel 302. The transmitter 300 may include a linear equalizer 304. The output of the VDFE 310 of the receiver 306 may supply information to the linear equalizer 304 of the transmitter 300. Particularly, the VDFE 310 may adjust the tap weights via the back channel 316 of the linear equalizer 304. The adaptation loop 312 and the mapper 314 of FIG. 3 (described in exploded view in FIG. 11) may create the output to adjust the tap weights of the linear equalizer 304. An exploded view of the adaptation loop 312 is illustrated in FIG. 10.

FIG. 4 is a transmitter 400 communicating with a receiver 406 with a decision feedback equalizer (DFE) 418 having a linear equalizer 404 in a feed-forward path whose pole and gain settings 416 are adjusted through a virtual decision feedback equalizer (VDFE) 410 in the receiver 406, according to one embodiment. The optional decision feedback equalizer (DFE) 418 may further reduce an inter-symbol interference (ISI). An exploded view of the VDFE 410 is illustrated in FIG. 8. The receiver 406 may include a DFE 418 in the feedback path of a decision device 408 (e.g., as shown in exploded view in FIG. 6). The VDFE 410 may include an adaptation loop 412 and a mapper 414 (described in exploded view in FIG. 11). An exploded view of the adaptation loop 412 is illustrated in FIG. 9. The VDFE 410 may be used to adjust the pole and gain settings 416 of the linear equalizer 404 which are now illustrated as being in the feed forward path similarly to as it was in FIG. 1. The difference between FIG. 1 and FIG. 4 is that FIG. 4 includes a DFE 418 in the feedback path of the decision device 408.

FIG. 5 is a transmitter 500 having a linear equalizer 504 whose Finite Impulse Response (FIR) tap weights are adjusted via a back channel 516 from a virtual decision feedback equalizer (VDFE) 510 in a receiver 506 having a decision feedback equalizer (DFE) 518, according to one embodiment. The VDFE 510 of the receiver 506 includes an adaptation loop 512 and a mapper 514 (described in exploded view in FIG. 11). An exploded view of the VDFE 510 is illustrated in FIG. 8. The adaptation loop 512 and the mapper 514 may create the output information that is used to adjust the tap weights via the back channel 516 of the linear equalizer 504. An exploded view of the adaptation loop 512 is illustrated in FIG. 9.

Figure 6:
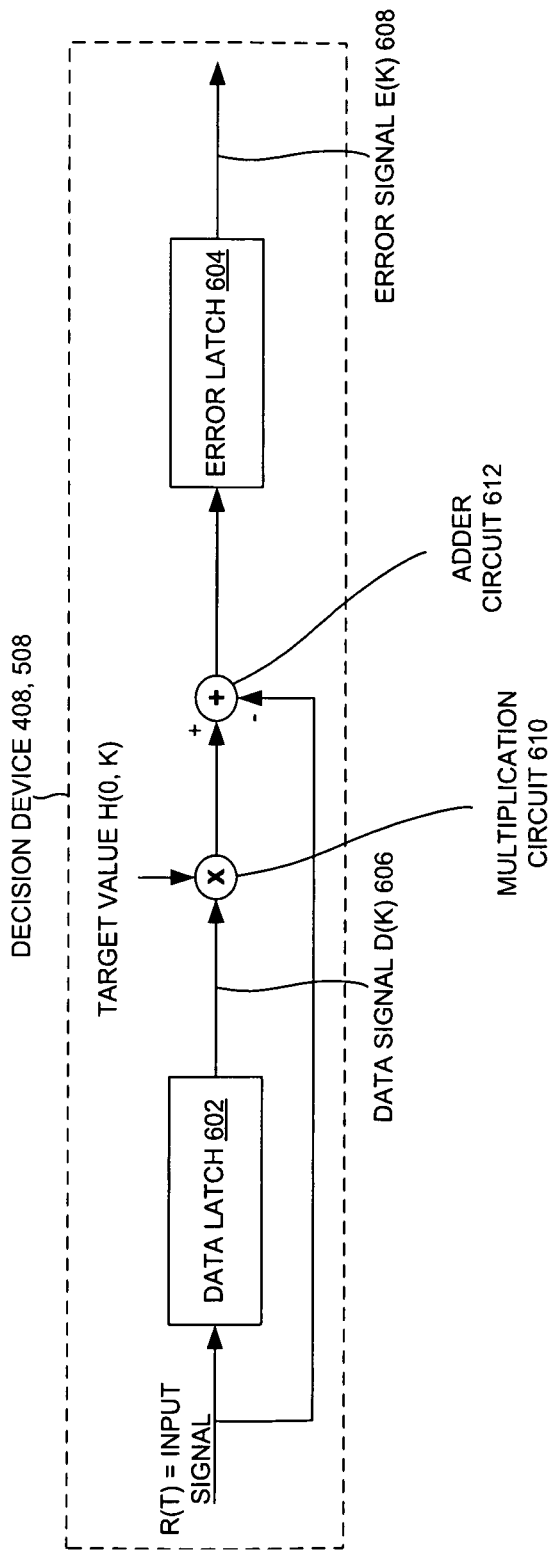
FIG. 6 is an exploded view of a decision device as illustrated in FIGS. 4 and 5 having a data latch to sample an input and to generate a current data signal, an error latch to generate the error signal, a multiplication circuit to multiply a current data signal by a target value, and an adder circuit to compare an input to the output of the multiplication circuit, according to one embodiment.

FIG. 5 is similar to FIG. 3 except that in FIG. 5 the DFE 518 is present in the feedback path of a decision device 508 (e.g., as described in the description of FIG. 6). The optional decision feedback equalizer (DFE) 518 may further reduce an inter-symbol interference (ISI).

In some example embodiments, several types of equalization may be used with the VDFE (e.g., the VDFE of FIGS. 1-5 and/or 8). The choice may depend on the performance requirement and the rest of system architecture (e.g., a Serializer/Deserializer that converts data between serial data and parallel interfaces in each direction). If a real DFE (e.g., the DFE of FIG. 4, the DFE of FIG. 5) is already in the receiver using the center of eye equalization, the VDFE may use the same type of equalization, enabling the two to share the cost of the error latch as shown in FIG. 6. If a bang bang timing loop is already in the receiver and using the error latch as shown in FIG. 7, then the VDFE may use edge based equalization. This may avoid use of two different error latches (one error latch 604 shown in FIG. 6 and the other error latch 704 shown in FIG. 7). The equalization may also be chosen based on which of the vertical eye opening and the horizontal opening needs to be larger in order to have adequate performance.

FIG. 6 is an exploded view of a decision device 408, 508 as illustrated in FIGS. 4 and 5 having a data latch 602 to sample an input and to generate a current data signal, an error latch 604 to generate the error signal, a multiplication circuit 610 to multiply a current data signal by a target value, and an adder circuit 612 to compare an input to the output of the multiplication circuit, according to one embodiment. Particularly, FIG. 6 illustrates the data latch 602 that produces the data signal D(K) 606 (e.g., where 'K' is the index to the data sample) and an error latch 604 that produces an error signal E(K) 608. The example embodiment of FIG. 6 illustrates a decision device similar to the embodiments of FIG. 4 and/or FIG. 5.

As described previously, the embodiment shown in FIG. 6 may be the decision device 408 of FIG. 4 and/or the decision device 508 of FIG. 5. The decision device 108, 208 and 308 of FIG. 1, FIG. 2 and FIG. 3 may use the decision device shown in FIG. 7. The decision module (e.g., similar to the decision device 408, 508 but may be software and/or hardware) illustrated in FIG. 6 includes a data latch 602 to sample R(T) (e.g., the input signal, where 'T' is the time) and to generate the data signal D(K) (e.g., a current data signal, where 'K' is the index to the signal). A multiplication circuit 610 is illustrated in FIG. 6 which multiplies the data signal D(K) (the current data signal) by the target value H(0,K).

Next, an adder circuit 612 compares R(T) (the input signal) to a target value (H(0,K)) multiplied by the data signal D(K) 606 (e.g., a current data signal). Then, an error latch 604 of FIG. 6 generates the error signal E(K) 608. In summary, FIG. 6 illustrates that R(T), an input signal of the decision device 408, 508 is compared to a target value (H(0,K) multiplied by a data signal D(K) 606 (e.g., a current data signal) through a multiplication circuit 610 and an adder circuit 612 to generate a difference that is the error signal E(K) 608.

FIG. 7 is an exploded view of a decision device 108, 208, and 308 of FIGS. 1, 2 and 3 having a data latch 702 to sample an input and to generate a current data signal, an error latch 704 in which the input to the decision device 108, 208, 308 is sampled at a different phase (e.g., 90 degrees shift) than that of the current data signal, a shift register to store a previous data signal, a XOR circuit to determine if the current data signal and the previous data signal have the same polarity and a multiplexer to select the error latch output or zero based on whether the current data signal has different polarity from the previous data signal, according to one embodiment. The decision device shown in FIG. 7 is similar to the decision device 108, the decision device 208 and the decision device 308 that may be used in FIG. 1, FIG. 2 and FIG. 3 respectively.

Particularly, the decision device 108, 208 and 308 as illustrated in FIG. 7 may be used when a DFE is not present in the receiver side of the system. When the DFE is present in the receiver side (e.g., the DFE 418, 518 of FIGS. 4 and 5), the decision device of FIG. 6 may be used. A data latch 702 in FIG. 7 may sample R(T) (e.g., the input) to generate a current data signal. In FIG. 7, the input R(T) may be sampled at a different phase (e.g., a 90 degree shift) than that of the current data signal if the current data signal has different polarity from a previous data signal (e.g., a shift register 708 may store the previous data signal) when the error latch 704 generates P(K) 720 (an error latch output). A XOR circuit 710 may determine if the current data signal and the previous data signal have the same polarity. An error latch 704 in FIG. 7 may generate the error signal through a multiplexer 706. The multiplexer 706 may select P(K) 720 (the error latch output) or zero based on whether the current data signal has different polarity from the previous data signal to generate the error signal E(K) as illustrated in FIG. 7. The error signal E(K) in FIG. 7 may be set to zero when polarity of the current data signal and polarity of the previous data signal are the same.

FIG. 8 is an exploded view of a virtual decision feedback equalizer (VDFE) 110, 210, 310, 410, and 510 of FIGS. 1-5 having adaptation loops 812, which can be any one of the adaptation loops 112 through 512, and a mapper 814, which can be any one of the mappers 114 through 514. The VDFE is used to generate a modification in a linear equalizer setting based on a data signal and an error signal, according to one exemplary embodiment.

In FIG. 8, the data signal $D(K-T_1)$ $806_1$ (where $T_1$ is the tap position of the $1^{st}$ tap) through the data signal $D(K-T_N)$ $806_N$ (where $T_N$ is the tap position of the Nth tap) and the error signals E(K) $808_1$ through the error signals E(K) $808_N$ provide input to the adaptation loops $812_1$ through $812_N$. The adaptation loops then provide an output in the form of an up and down value for $H(T_1,K)$ to $H(T_N,K)$. The up and down values are then transmitted to the mapper 814 that is used to provide an output ($U_p/D_N$ Zero, $U_p/D_N$ Pole, $U_p/D_N$ Gain). It should be mentioned that the notation '$U_p/D_N$' means 'up or down'.

FIG. 9 is an exploded view of an adaptation loop 212, 412, 512 of FIGS. 2, 4 and 5, having a XOR circuit to determine if an average of a single data signal has a same polarity as that of the error signal, and a multiplexer to select an increase or a decrease of the DFE tap weight value, according to one embodiment. The adaptation loop of FIG. 9 may be the adaptation loop 212 of FIG. 2, the adaptation loop 312 FIG. 3, the adaptation loop 412 of FIG. 4, the adaptation loop 512 of FIG. 5 and/or the adaptation loop 812 of FIG. 8.

The adaptation loop 212, 412, 512 as illustrated in FIG. 9 includes a XOR circuit 908 that determines if an average of the current data signal has a same polarity as that of the error signal E(K). Then, a multiplexer 910 o FIG. 9 selects either an increase or a decrease of the DFE tap weight value.

FIG. 10 is an exploded view of an adaptation loop 112, 212, 312 of FIGS. 1, 2, and 3 having an adder circuit to add a current data signal and a previous data signal, a shift circuit to determine an average of the current data signal and the previous data signal, a XOR circuit to determine if an average of the current data signal and the previous data signal has a same polarity as that of the error signal, and a multiplexer to select an increase or a decrease of the DFE tap weight value, according to one embodiment.

The adaptation loop 112, 212, 312 as illustrated in FIG. 10 includes a XOR circuit 1008 that determines if an average of the current data signal and a previous data signal (e.g., $D(K-T_i)$ and $D(K-T_i-1)$ added by an adder circuit and then left shifted by 1 through a shift circuit to generate the average of the current data signal and the previous data signal in FIG. 10, where $T_i$ is the tap position) has a same polarity as that of the error signal E(K). Then, a multiplexer 1010 o FIG. 9 selects either an increase or a decrease of the DFE tap weight value ($U_pD_N$ for $H(T_i, K)$).

Figure 11:
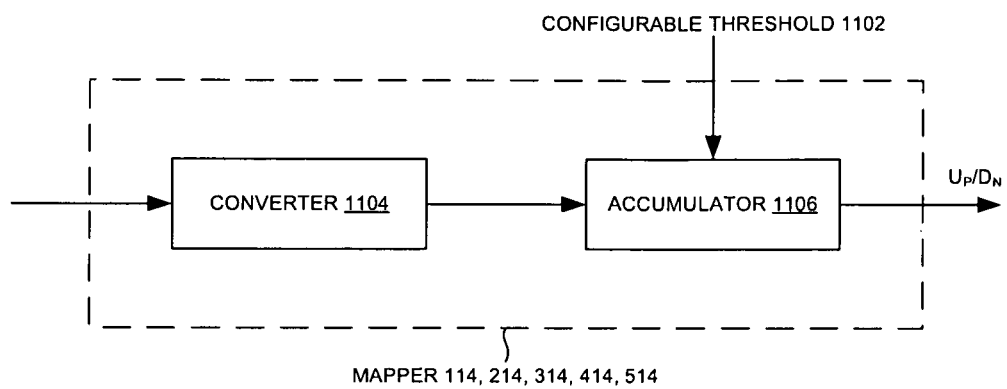
FIG. 11 is an exploded view of a mapper of FIGS. 1-5, having a converter and an accumulator to filter a modification in the linear equalizer setting, according to one exemplary embodiment.

FIG. 11 is an exploded view of a mapper 114, 214, 314, 414, 514 of FIGS. 1-5, having a converter 1104 and an accumulator 1106 to filter a modification in the linear equalizer setting, according to one exemplary embodiment. The mapper, as illustrated in FIG. 11, may include a converter 1104 and an accumulator 1106. In one embodiment, the accumulator 1106 may filter the changes in the linear equalizer setting. A configurable threshold 1102 may allow the accumulator 1106 to be adjusted.

The converter 1104 may vary between different embodiments. The converter 1104 may vary when different output is required due to a change in the location of the linear equalizer. The converter 1104 may provide different types of outputs of the VDFE to adjust settings of the linear equalizer. The outputs of the converter 1104 may depend on whether the linear equalizer is located in either the receiver and/or the transmitter. The converter 1104 may also provide different types of output depending on the particular location of the linear equalizer in the receiver (e.g., in a feedback and/or feed forward path). Particularly, the converter 1104 may adjust pole and/or gain settings. The converter 1104 may also adjust tap weights as a function of the type (e.g., continuous time linear equalizer or a FIR filter) of the linear equalizer. The converter 1104 may provide an up and down factor to a tap weight of the linear equalizer and a pole and gain setting of the linear equalizer. The converter 1104 direction of change in gain and pole setting may be found using a table lookup. The bias current of transistors in the linear equalizer may be varied based on output of the VDFE.

Figure 12A:
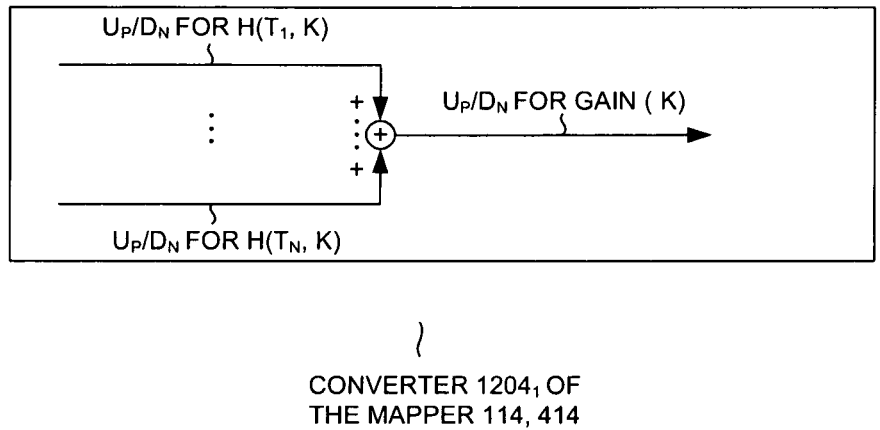
FIG. 12A is an exploded view of a converter of a mapper of FIGS. 1 and 4 to generate a modification in a linear equalizer setting by performing an average of a set of changes in a specified number of DFE tap weight values, according to one embodiment.

FIG. 12A is an exploded view of a converter $1204_1$ of a mapper 114, 414 of FIGS. 1 and 4 to generate a modification in a linear equalizer setting by performing an average of a set of changes in a specified number of DFE tap weight values, according to one embodiment. In FIG. 12A, an adder circuit is illustrated as adding up a set of changes of a number of DFE tap weight values ($U_pD_N$ for $H(T_i, K)$ to $U_pD_N$ for $H(T_N, K)$) to generate the modification ($U_pD_N$ for Gain (K)).

Figure 12B:
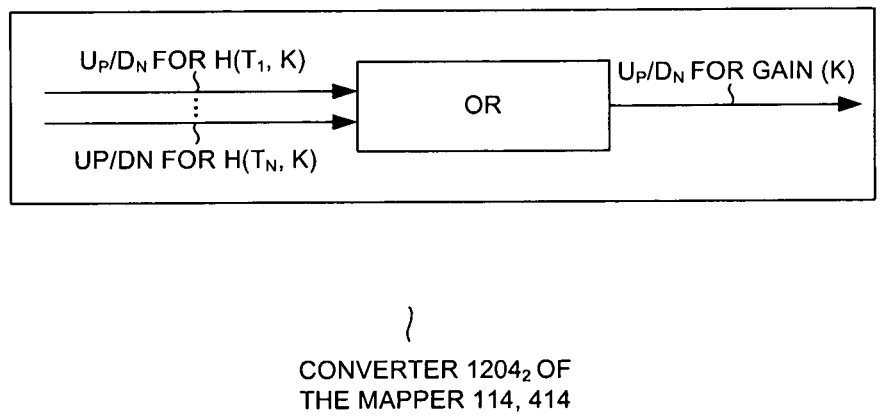
FIG. 12B is an exploded view of a converter of a mapper of FIGS. 1 and 4 to generate a modification in a linear equalizer setting by performing a logic OR of the set of changes in the specified number of the DFE tap weight values, according to one embodiment.

FIG. 12B is an exploded view of a converter 12042 of a mapper 114, 414 of FIGS. 1 and 4 to generate a modification in a linear equalizer setting by performing a logic OR of the set of changes in the specified number of the DFE tap weight values ($U_pD_N$ for $H(T_i, K)$ to $U_pD_N$ for $H(T_N, K)$), according to one embodiment. In FIG. 12B, a logic OR is performed on the DFE tap weight values ($U_pD_N$ for $H(T_i, K)$ to $U_pD_N$ for $H(T_N, K)$) to generate the modification ($U_pD_N$ for Gain (K)).

Figure 12C:
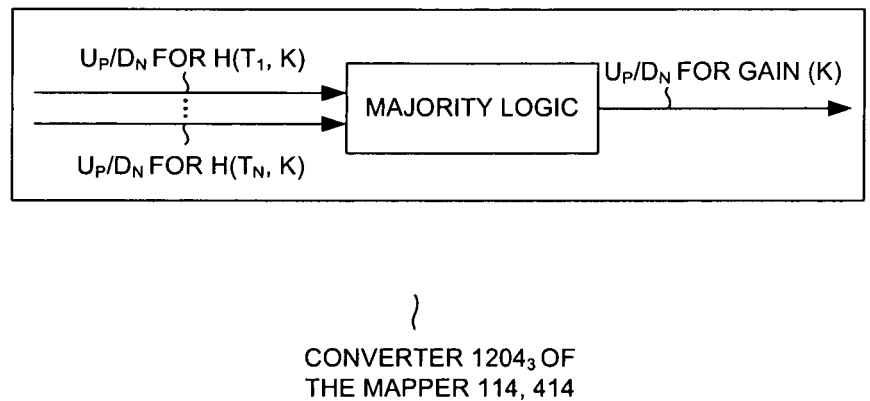
FIG. 12C is an exploded view of a converter of a mapper of FIGS. 1 and 4 to generate a modification in a linear equalizer setting by setting a same polarity as that of a majority of the set of changes in the specified number of DFE tap weight values, according to one embodiment.

FIG. 12C is an exploded view of a converter 12043 of a mapper 114, 414 of FIGS. 1 and 4 to generate a modification in a linear equalizer setting by setting a same polarity as that of a majority of the set of changes in the specified number of DFE tap weight values, according to one embodiment. In FIG. 12C, a majority logic circuit is used to select a dominant polarity of the set of changes of a number of DFE tap weight values ($U_pD_N$ for $H(T_i, K)$ to $U_pD_N$ for $H(T_N, K)$) to generate the modification ($U_pD_N$ for Gain (K)).

Figure 13:
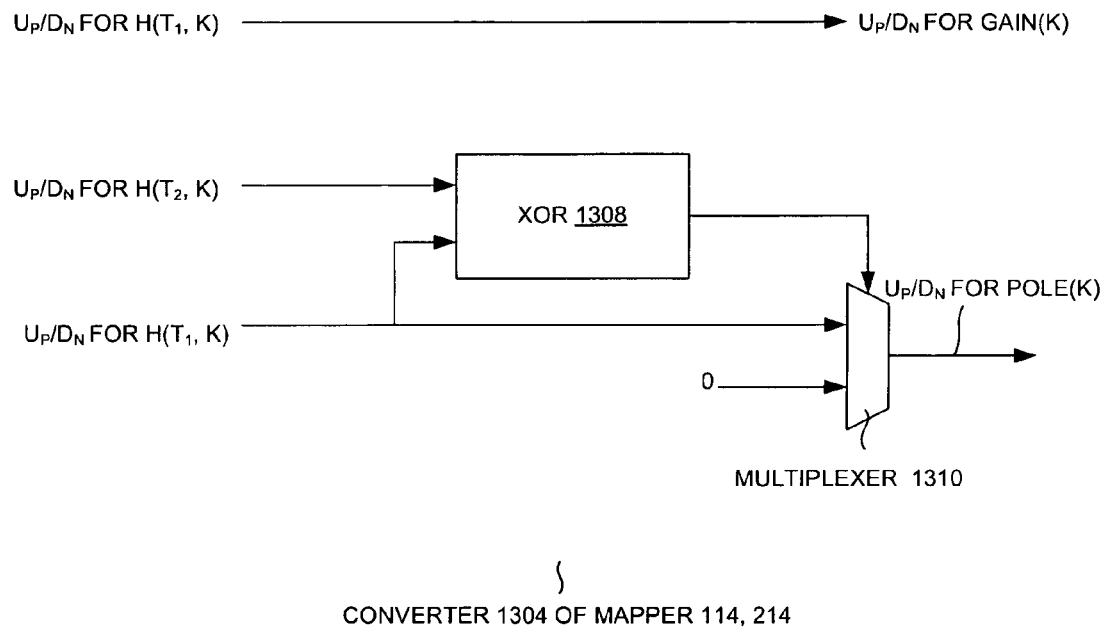
FIG. 13 is an exploded view of a converter of a mapper of FIGS. 1 and 2 having a XOR circuit to compare a polarity of the change of a first DFE tap weight value with a polarity of a second DFE tap weight value and a multiplexer circuit to output a change or no change based on whether a first DFE tap weight change has a same polarity as a second DFE tap weight change, according to one embodiment.

FIG. 13 is an exploded view of a converter 1304 of a mapper 114, 214 of FIGS. 1 and 2 having a XOR circuit 1308 to compare a polarity of the change of a first DFE tap weight value with a polarity of a second DFE tap weight value and a multiplexer circuit 1310 to output a change or no change based on whether a first DFE tap weight change has a same polarity as a second DFE tap weight change, according to one embodiment.

In FIG. 13, a XOR circuit may compare a polarity of the change of the first DFE tap weight value ($U_pD_N$ for $H(T_1, K)$) with the polarity of a second DFE tap weight value ($U_pD_N$ for $H(T_2, K)$). Then, a multiplexer circuit 1310 may output a change ($U_pD_N$ for pole (K)) or a no change '0' based on whether a first DFE tap weight change ($U_pD_N$ for $H(T_1, K)$) has a same polarity as a second DFE tap weight change ($U_pD_N$ for $H(T_2, K)$). A change in the first DFE tap weight value ($U_pD_N$ for $H(T_1, K)$) may be used if it has a different polarity from a change in the second DFE tap weight value ($U_pD_N$ for $H(T_2, K)$). If the polarities are the same, the multiplexer 1310 may output a zero '0' value. A setting of the continuous time linear equalizer may be (1) a pole setting adjusted according to a change parameter only if a specified number of change parameters have different polarity as described above (2) a gain setting ($U_pD_N$ for Gain (K) as shown in the upper portion of FIG. 13. In an alternate embodiment, the setting of the continuous time linear equalizer may have a zero setting.

Figure 14:
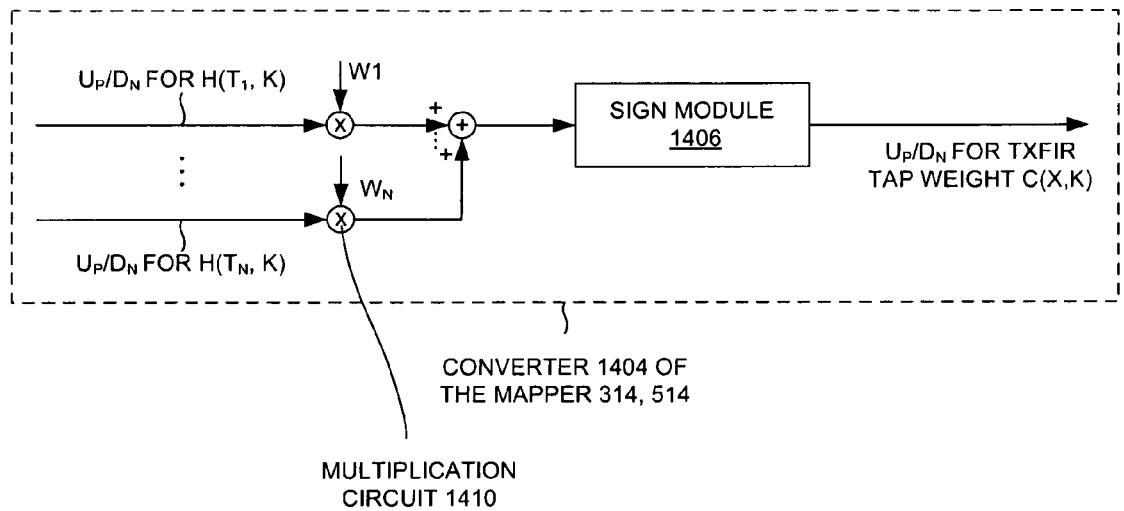
FIG. 14 is an exploded view of a converter of a mapper of FIG. 3 and of FIG. 5 having a multiplication circuit to multiply changes in the DFE tap weight with a coefficient, an adder circuit to obtain an average of a set of changes in a specified number of DFE tap weight values, and a sign module to determine the polarity of the output of the adder circuit, according to one embodiment.

FIG. 14 is an exploded view of a converter 1404 of a mapper 314, 514 of FIG. 3 and of FIG. 5 having a multiplication circuit 1410 to multiply changes in the DFE tap weight with a coefficient, an adder circuit to obtain an average of a set of changes in a specified number of DFE tap weight values, and a sign module to determine the polarity of the output of the adder circuit, according to one embodiment. In FIG. 14, the mapper may be used in the embodiments of FIG. 3 and FIG. 5.

In FIG. 14, a multiplication circuit is illustrated as multiplying changes in the DFE tap weight ($U_pD_N$ for $H(T_i, K)$ to $U_pD_N$ for $H(T_N, K)$ with a coefficient ($W_1$ to $W_N$). Then, an adder circuit may be used to average a set of changes in a specified number of DFE tap weight values ($U_pD_N$ for $H(T_i, K)$ to $U_pD_N$ for $H(T_N, K)$. Then, as illustrated in FIG. 14, a sign module 1406 is used to determine a polarity of the output signal of the adder circuit to generate a change in a FIR tap weight value (e.g., $U_pD_N$ for TXFIR tap weight C(X,K), where 'X' is the tap position).

Figure 15:
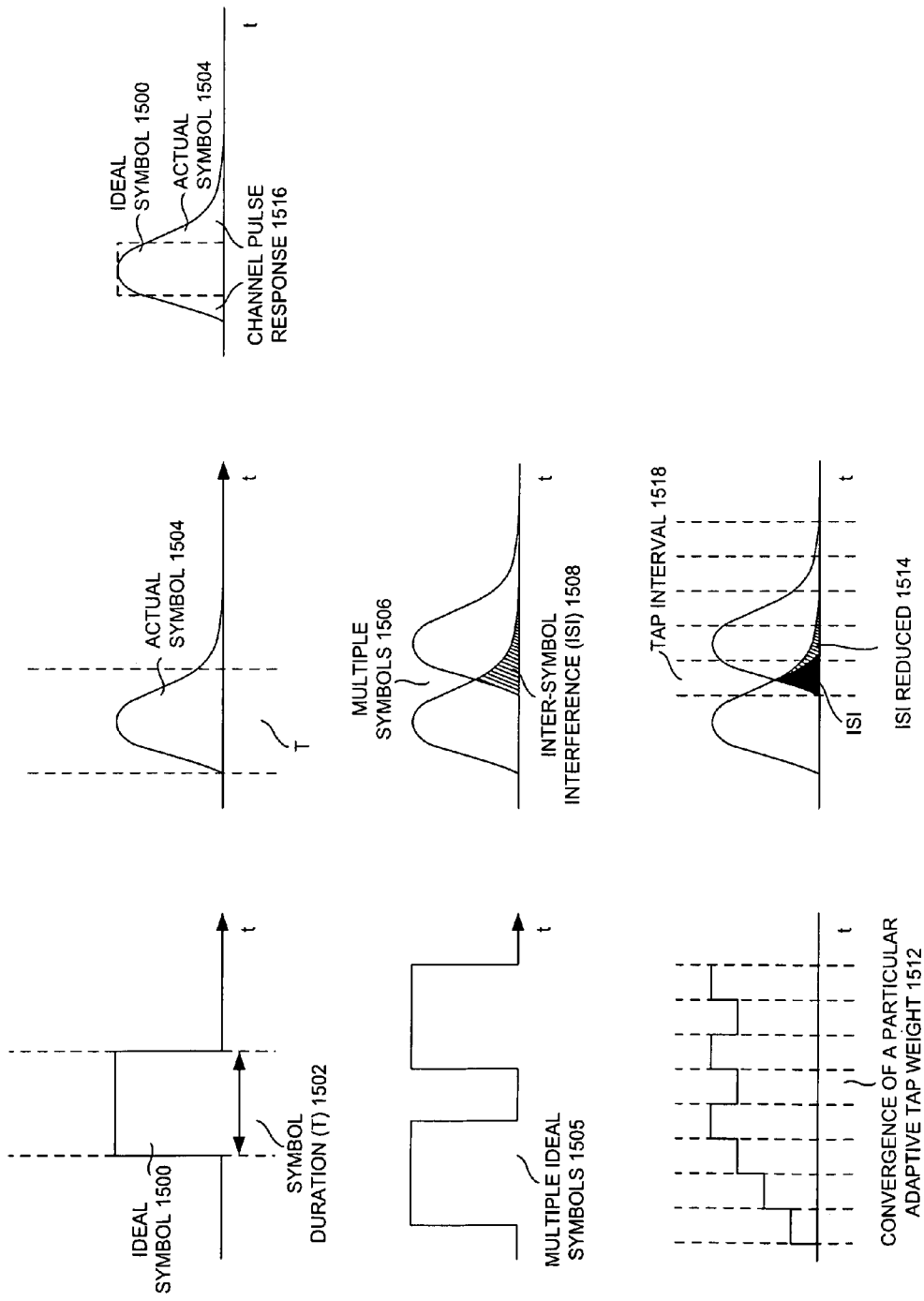
FIG. 15 is a graphical process view of reducing intersymbol interference (ISI), according to one embodiment.

FIG. 15 is a graphical process view of reducing intersymbol interference (ISI), according to one embodiment. FIG. 15 is a graphical view illustrating ideal symbols, actual symbols, and ISI reduced by adaptive tap weights, according to one embodiment. Particularly, FIG. 15 illustrates an ideal symbol 1500, a symbol duration (T) 1502, an actual symbol 1504, multiple ideal symbols 1505, multiple symbols 1506, a inter-symbol interference (ISI) 1508, tap interval 1518, convergence of a particular adaptive tap weight 1512, ISI reduced by DFE or linear equalizer 1514 and a channel pulse response 1516, according to one embodiment.

The ideal symbol 1500 may be an expected perfect signal. The symbol duration (T) 1502 may be the duration of an ideal symbol 1500. The actual symbol 1504 may be a symbol that may be received in place of an ideal symbol in real life scenarios. The multiple ideal symbols 1505 illustrate a series of ideal symbols 1500. The multiple symbols 1506 may be actual symbols that may be received in place of multiple ideal symbols 1505.

The inter-symbol interference (ISI) 1508 may be a form of distortion (e.g., noise, disturbance, etc.) of a signal in which one symbol interferes with other symbols. The tap interval 1518 may be time intervals at which the DFE taps (e.g., operations, fixed voltage, average voltage, etc.) may be applied proportionally to the symbol to remove distortion (e.g., ISI). The convergence of a particular adaptive tap weight 1512 may be an approximate digital value of the signals (e.g., may be derived from analog signal) for an interval. The linear equalizer setting may be adjusted continuously (e.g., in a loop pattern) and/or may be adjusted until the DFE tap weight value converges. Convergence may be determined by (1) determining that the change in the DFE tap weight value is lower than a first threshold determined from an offline simulation, and/or (2) determining that a number of symbols since a beginning of an adaptation is below a second threshold determined from the offline simulation.

The distortion reduced by DFE or linear equalizer 1514 may illustrate the reduction in the ISI 1508 by application of adaptive weights. The channel pulse response 1516 may be the response of a channel that may lead to ISI 1508 when the ideal symbol 1504 is transmitted through the channel.

Figure 16:
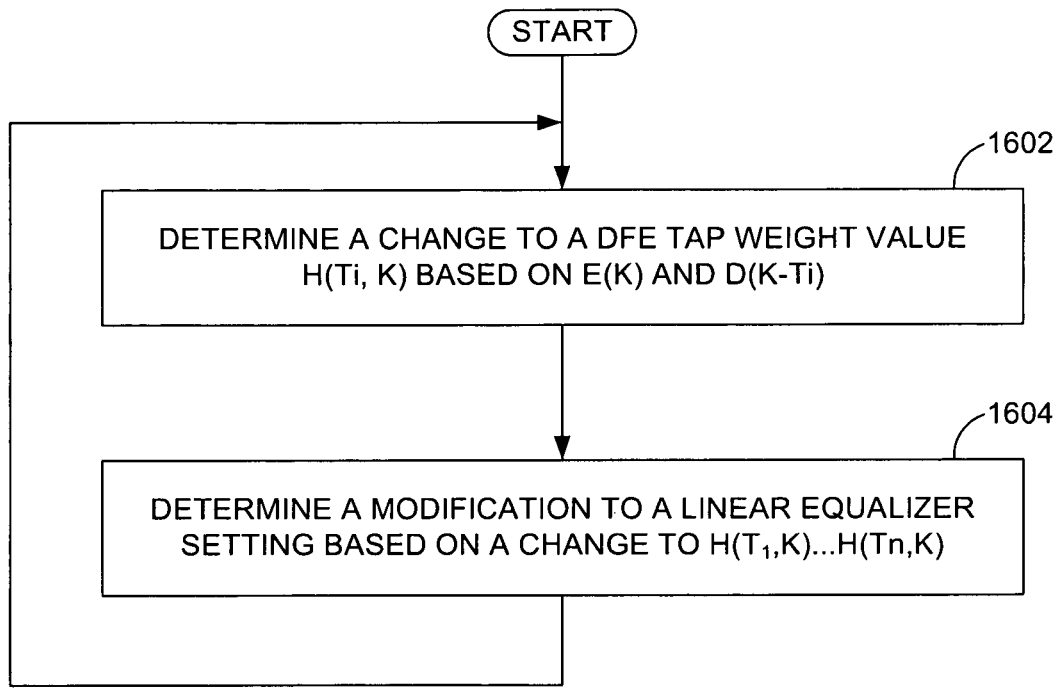
FIG. 16 is a process flow of determining a modification to a linear equalizer setting based on a change to $H(T1, K), \ldots, H(Tn,K)$, according to one embodiment.

FIG. 16 is a process flow of determining a modification to a linear equalizer setting based on a change to $H(T_1, K), \ldots, H(T_N,K)$, according to one embodiment (e.g., using one of the configurations previously described in FIGS. 1-5). In operation 1602, change to tap weight $H(T_i, K)$ may be determined based on E(K) and $D(K-T_i)$ (e.g., using one of the adaptation loops previously described in FIGS. 9-10). In operation 1604, the modification to the linear equalizer settings may be determined based on a change to $H(T_1,K) \ldots H(T_N,K)$ (e.g., using one of the converters previously described in FIGS. 12A-FIG. 14).

It should be noted that in some embodiments, the VDFE may act like a typical DFE with the exception that no feedback is implemented. The VDFE as described in the various embodiments of FIGS. 1-5 and 8 may have several taps just like a regular DFE. The tap weights may be adapted using the same method as a DFE (e.g., using the outputs of a data latch and an error latch). The following operations may be taken to use VDFE to adapt linear equalization:

Operation One: Allow the VDFE to adapt its tap weights. The tap weights may be an estimate of the channel pulse response at corresponding time instants.

Operation Two: Map the adjustments for the virtual taps to actions on the control knobs of linear equalizer (e.g., pole locations and gain for analog filter, tap weights for FIR, etc.).

Operation Three: Allow the linear equalizer to serve as the feedback of VDFE (e.g., it influences the ISI).

Operation Four: Allow the adaptation to continue until the mean square error is minimized. When the minimization occurs there may be no further adjustments for the virtual taps and consequently no adjustments for the linear equalizer control knobs.

Operation Five: If there is a change in channel due to temperature etc., adaptation may start again until the mean error is minimized for the new channel. There may be variations for each type of linear equalizer.

It should be recognized that any of the embodiments of FIGS. 1-5 may perform a method of adjusting a setting of a linear equalizer including determining a change to a decision feedback equalizer (DFE) tap weight value of a predefined metric according to a data signal and an error signal (e.g., the change may be generated according to an average of a specified number of data signals and the error signal), using the change in the DFE tap weight value to algorithmically generate a modification in a linear equalizer setting, and adjusting the linear equalizer setting. The DFE tap weight values used to generate the modification in the linear equalizer setting may be different from those used by a real DFE if it exists in a same receiver and/or transmitter.

It should be noted that the various embodiments described in FIGS. 1 to 16 may operate in a communications system having a linear equalizer to reduce an inter-symbol interference (ISI); a decision device to generate a data signal and an error signal; and a VDFE subsystem. The VDFE subsystem may generate a change to a DFE tap weight value according to a data signal and an error signal. In addition, the VDFE may use the change in the DFE tap weight value to algorithmically generate the modification in a linear equalizer setting and may adjust the linear equalizer setting.

The VDFE subsystem may further include an adaptation loop to generate the change to the DFE tap weight value according to the data signal and the error signal; and a mapper subsystem. The adaptation loop may generate a change in a DFE tap weight value according to an average of a specified number of data signals and the error signal. The mapper subsystem may map the change in the DFE tap weight value to the modification in the linear equalizer setting, and may adjust the linear equalizer setting until the DFE tap weight value converges. The mapper subsystem may include a converter to use the change in the DFE tap weight value to algorithmically generate the modification in the linear equalizer setting and an accumulator to filter an output of the converter.

It should also be understood that the VDFE described in the various embodiments of FIGS. 1-5 and 8 may be used with or without a DFE (e.g., the DFE 418 and 518 of FIGS. 4 and 5) in a receiver. In either case, no additional latches may be required. If there is a real DFE, the error latch (e.g., the error latch 604 of FIG. 6) may be needed by the DFE. Consequently, the VDFE may reuse the latch. If there is no real DFE in the receiver, a bang bang timing loop (e.g., may require a error latch 704 as shown in FIG. 7), and/or a baud-rate timing loop (e.g., may require the error latch 604 as shown in FIG. 6) may be used. Consequently, the VDFE can either reuse the error latch 704 or 604, depending on the timing loop.

In will also be appreciated that an integrated circuit device may include a linear equalizer to reduce an inter-symbol interference (ISI); a decision module to generate a data signal and a error signal; a VDFE comprising an adaptation loop to determine a change to a decision feedback equalizer (DFE) tap weight value of a predefined metric according to a data signal and an error signal; and a mapper of the VDFE to use the change in the DFE tap weight value to algorithmically generate a modification in a linear equalizer setting.

Since no feedback is implemented, the implementation of VDFE may be simpler than that of a real DFE. For example, there may be no summing circuit. There may not be a need to satisfy the 1T timing constraint. Furthermore, DFE tap weight range and resolution may not be of concern. Tap positions of the DFE tap weight values may/may not consecutive. It should also be noted that the linear equalizer may be located in a feed-forward path and/or a feedback path of data transmission. In addition, linear equalizer may be located in a transmitter and/or a receiver. The linear equalizer may be a continuous time linear equalizer and/or a Finite Impulse Response (FIR) filter.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of adjusting a setting of a linear equalizer, comprising:
   determining a change to a virtual decision feedback equalizer (DFE) tap weight value of a predefined metric according to a data signal and an error signal generated through a decision device coupled to an output of the linear equalizer, a virtual DFE related to the virtual DFE tap weight value being implemented with no feedback circuit between the decision device and the output of the linear equalizer, a channel response related to a requirement of equalization being unknown in advance, and the virtual DFE tap weight value being related to an estimate of the channel response at a corresponding time instant;
   using the change in the virtual DFE tap weight value to algorithmically generate a modification in the setting of the linear equalizer based on utilizing the linear equalizer as a feedback of the virtual DFE; and
   adjusting the setting of the linear equalizer until the predefined metric is optimized, wherein the generated modification in the setting of the linear equalizer further comprises:
   applying a logic XOR to compare a polarity of a change of a first virtual DFE tap weight value with a polarity of a change of a second virtual DFE tap weight value,
   selecting, by a multiplexer, the change in the first virtual DFE tap weight value when the polarity of the change of the first virtual DFE tap weight value and the polarity of the change of the second virtual DFE tap weight value are different, and selecting zero when the polarity of the changes of the first and second virtual DFE tap weight values are the same, and
   filtering, by an accumulator, the modification in the setting of the linear equalizer.

2. The method of claim 1, wherein the error signal is generated by at least one of:
   comparing an input to the decision device to a target value multiplied by a current data signal to generate a difference that is the error signal;
   sampling the input to the decision device at a different phase than that of the current data signal if the current data signal has different polarity from a previous data signal to generate the error signal; and
   setting the error signal to zero when polarity of the current data signal and polarity of the previous data signal are the same.

3. The method of claim 1, wherein the change in the virtual DFE tap weight value is generated according to an average of a specified plurality of data signals and the error signal.

4. The method of claim 1, wherein the setting of the linear equalizer is adjusted until the virtual DFE tap weight value converges, and wherein convergence is determined by at least one of:
   determining that the change in the virtual DFE tap weight value is lower than a first threshold determined from an offline simulation, and
   determining that a number of symbols since a beginning of an adaptation is below a second threshold determined from the offline simulation.

5. The method of claim 1, wherein the linear equalizer is a time linear equalizer and a setting of the time linear equalizer is at least one of:
   a pole setting,
   a gain setting, and
   a zero setting.

6. The method of claim 1, wherein the linear equalizer is a Finite Impulse Response (FIR) filter and a setting of the FIR filter is a tap weight of the FIR filter.

7. The method of claim 1, further comprising:
   wherein a specified plurality of virtual DFE tap weight values used to generate the modification in the setting of the linear equalizer is different from those used by a second DFE if the second DFE exists in a same receiver, and
   wherein corresponding tap positions of the virtual DFE tap weight values are not consecutive.

8. A communication system comprising:
   a linear equalizer to reduce an inter-symbol interference (ISI);
   a decision device to generate a data signal and an error signal, the decision device being coupled to an output of the linear equalizer; and
   a virtual decision feedback equalizer (DFE) subsystem implemented with no feedback circuit between the decision device and the output of the linear equalizer, the virtual DFE subsystem being configured to:
generate a change to a virtual DFE tap weight value according to a data signal and an error signal,
use the change in the virtual DFE tap weight value to algorithmically generate the modification in a setting of the linear equalizer based on utilizing the linear equalizer as a feedback of the virtual DFE subsystem, the generated modification in the setting of the linear equalizer being implemented by a converter within a mapper subsystem of the virtual DFE subsystem, and
adjust the setting of the linear equalizer until the ISI is minimized,
wherein a channel response related to a requirement of the equalization in the system is unknown in advance,
wherein the virtual DFE tap weight value is related to an estimate of the channel response at a corresponding time instant, and
wherein the converter generates the modification in the setting of the linear equalizer by being configured to:
apply a logic XOR to compare a polarity of a change of a first virtual DFE tap weight value with a polarity of a change of a second virtual DFE tap weight value, and
select the change in the first virtual DFE tap weight value when the polarity of the change of the first virtual DFE tap weight value and the polarity of change of the second virtual DFE tap weight value are different, and selecting zero when the polarity of the changes of the first and second virtual DFE tap weight values are the same.

9. The communication system of claim 8, further comprising:
a second DFE to further reduce the ISI.

10. The communication system of claim 9, further comprising:
wherein the linear equalizer is at least one of a continuous time linear equalizer and a finite impulse response (FIR) filter,
wherein the linear equalizer is located in at least one of a feed-forward path and a feedback path of data transmission, and
wherein the linear equalizer is located in at least one of a transmitter and a receiver.

11. The communication system of claim 8, wherein the virtual DFE subsystem further comprises:
an adaptation loop to generate the change to the virtual DFE tap weight value according to the data signal and the error signal; and
the mapper subsystem:
to map the change in the virtual DFE tap weight value to the modification in the setting of the linear equalizer, and
to adjust the setting of the linear equalizer until the virtual DFE tap weight value converges.

12. The communication system of claim 11, wherein the adaptation loop is configured to generate the change in the virtual DFE tap weight value according to an average of a specified plurality of data signals and the error signal.

13. The communication system of claim 11, wherein the mapper subsystem further comprises:
an accumulator to filter an output of the converter.

14. An integrated circuit device, comprising:
a linear equalizer to reduce an inter-symbol interference (ISI);
a decision module to generate a data signal and an error signal, the decision module being coupled to an output of the linear equalizer;
a virtual decision feedback equalizer (DFE implemented with no feedback circuit between the decision module and the output of the linear equalizer and comprising an adaptation loop to determine a change to a virtual DFE tap weight value of a predefined metric according to the data signal and the error signal; and
a mapper of the virtual DFE to use the change in the virtual DFE tap weight value to algorithmically generate a modification in a setting of the linear equalizer based on utilizing the linear equalizer as a feedback of the virtual DFE,
wherein a channel response related to a requirement of equalization is unknown in advance,
wherein the virtual DFE tap weight value is related to an estimate of the channel response at a corresponding time instant, and
wherein the mapper further comprises:
an XOR circuit to compare a polarity of a change of a first virtual DFE tap weight value with a polarity of a change of a second virtual DFE tap weight value,
a multiplexer to select the change in the first virtual DFE tap weight value when the polarity of the change of the first virtual DFE tap weight value and the polarity of the change of the second virtual DFE tap weight value are different, and select zero when the polarity of the changes in the first and second virtual DFE tap weight values are the same, and
an accumulator to filter the modification in the setting of the linear equalizer.

15. The integrated circuit device of claim 14, further comprising:
a second decision feedback equalizer circuit to further reduce the ISI.

16. The integrated circuit device of claim 14, wherein the decision module further comprises at least one of:
a data latch to sample an input and to generate a current data signal,
an error latch to generate the error signal,
an adder circuit to compare the input to a target value multiplied by the current data signal,
a shift register to store a previous data signal,
a XOR circuit to determine if the current data signal and the previous data signal have the same polarity,
a multiplication circuit to multiply the current data signal by the target value, and
a multiplexer to select at least one of the error latch output and zero based on whether the current data signal has different polarity from the previous data signal.

17. The integrated circuit device of claim 14, wherein the adaptation loop further comprises at least one of:
a XOR circuit to determine if an average of the current data signal and a previous data signal has a same polarity as that of the error signal,
a multiplexer to select at least one of an increase and a decrease of the virtual DFE tap weight value,
an adder circuit to add the current data signal and the previous data signal, and
a shift circuit to determine an average of the current data signal and the previous data signal.

* * * * *